Figure 1:
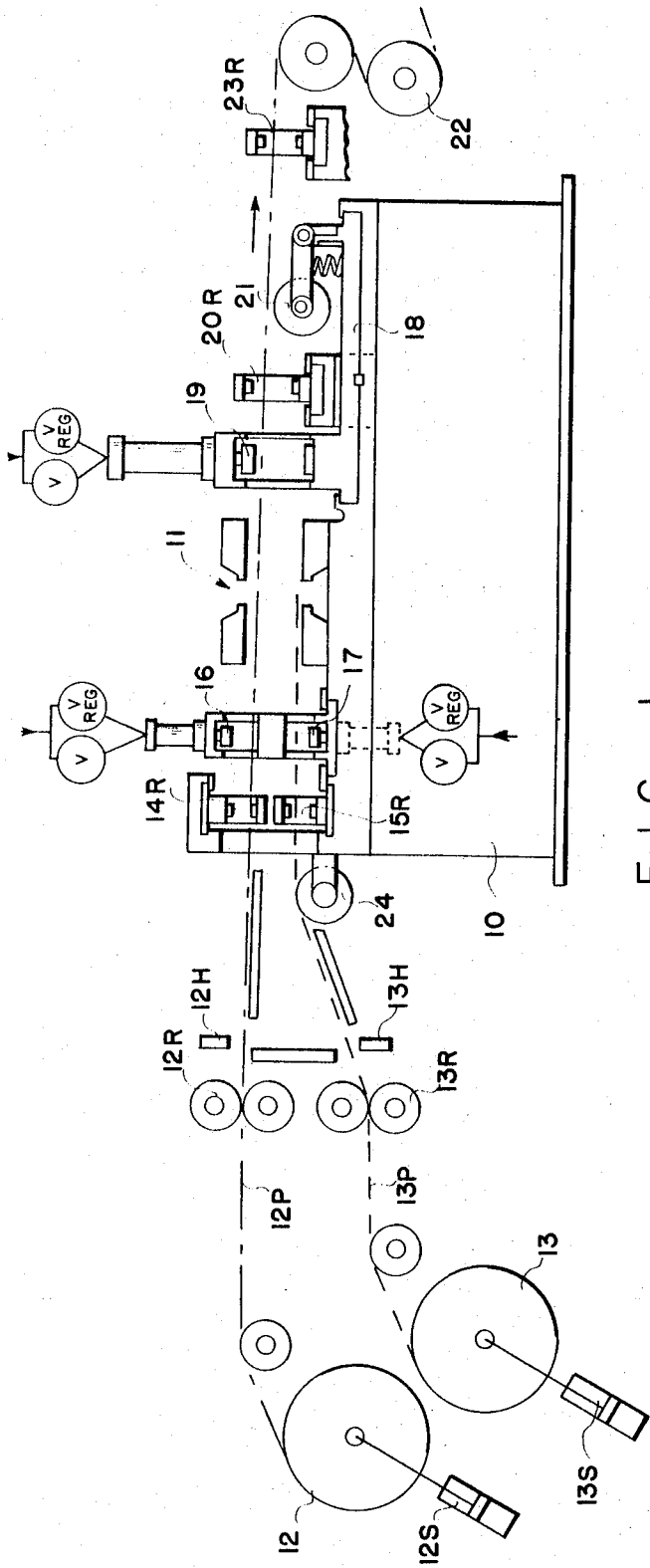

INVENTOR.
ROBERT S. ELLIS
BY Francis J. Klempay
ATTORNEY

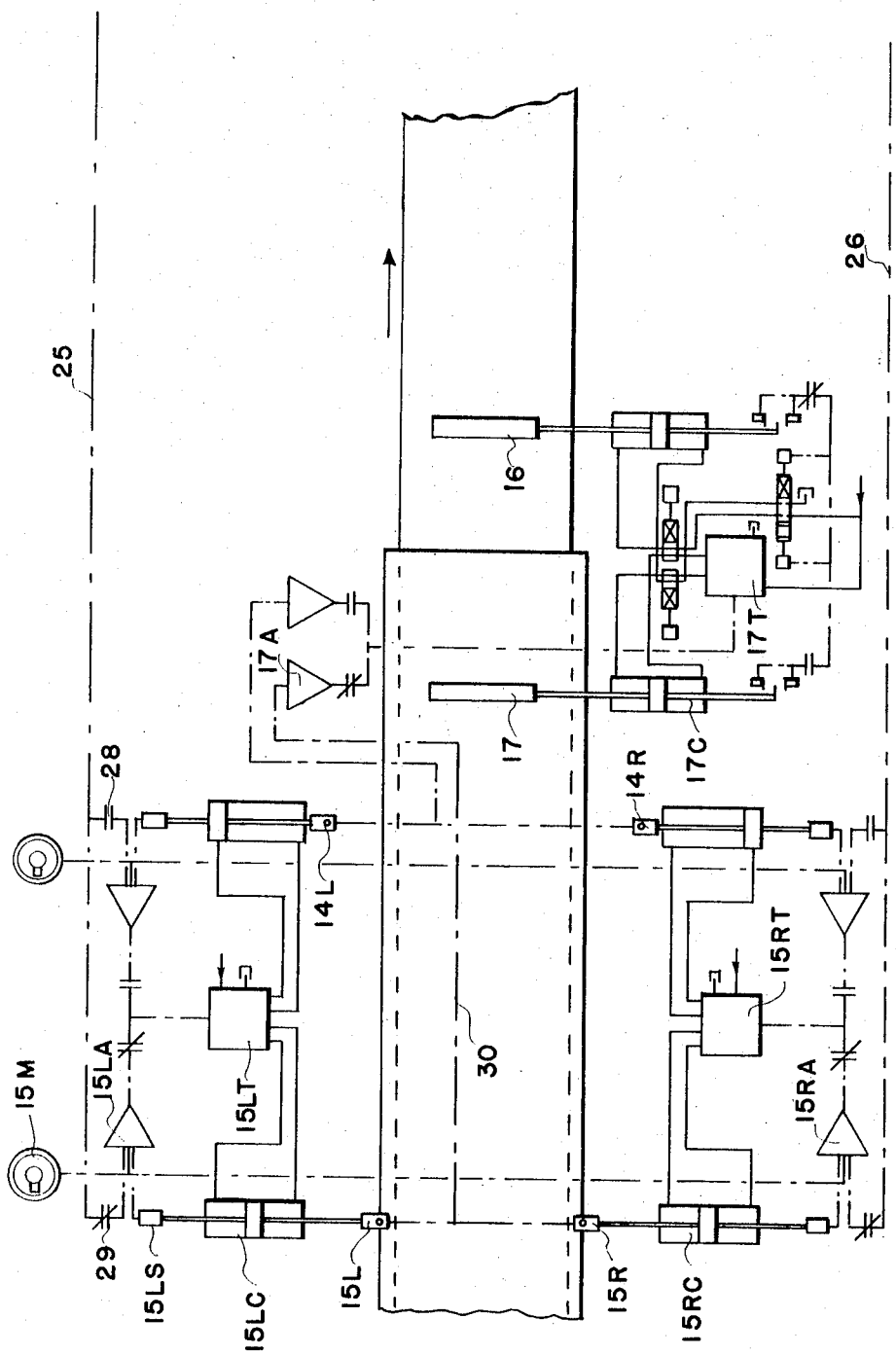

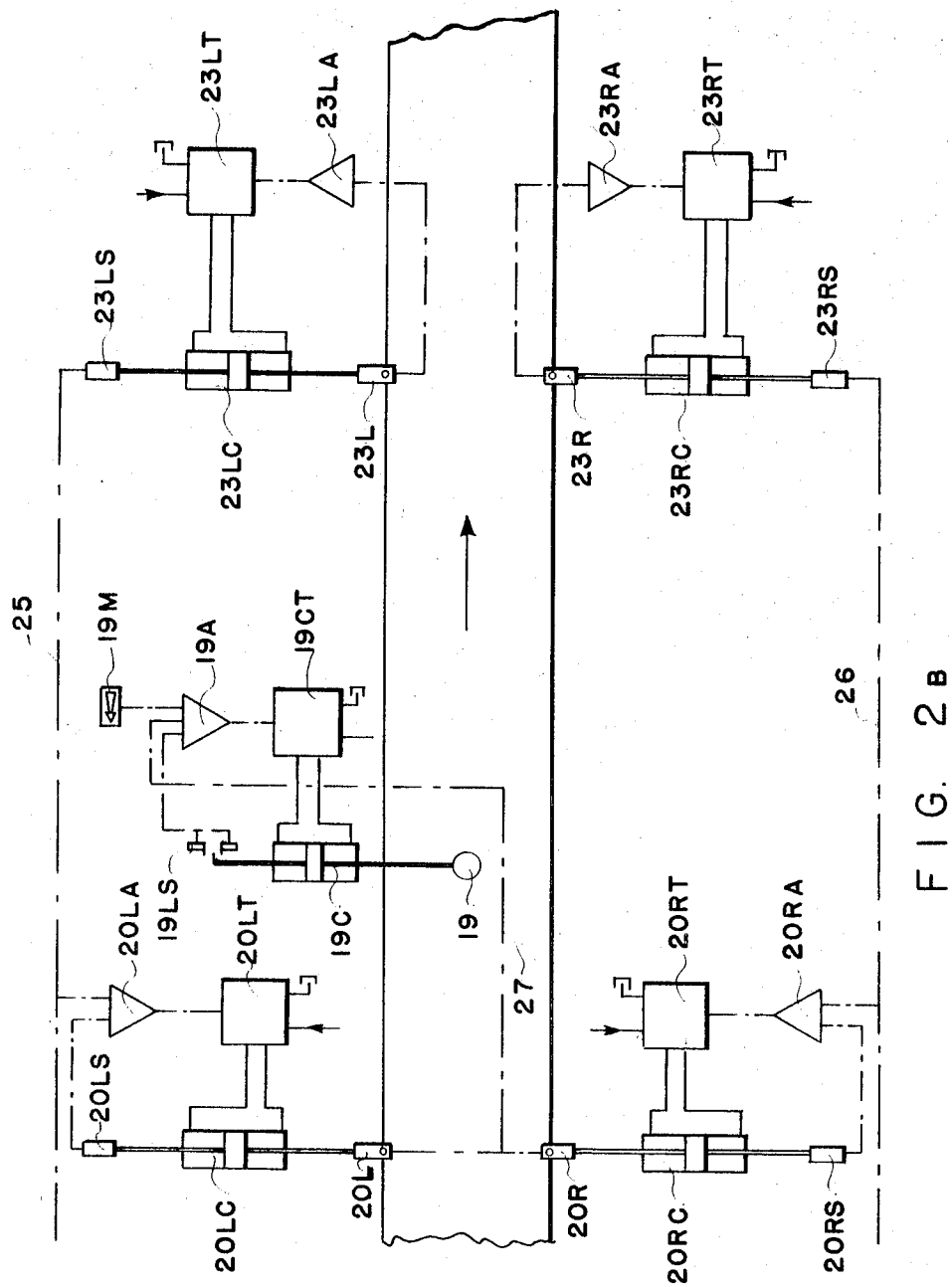

United States Patent Office 3,355,079
Patented Nov. 28, 1967

3,355,079
APPARATUS FOR ALIGNING STRIP IN
STRIP JOINING EQUIPMENT
Robert S. Ellis, Flossmoor, Ill., assignor to The Taylor-Winfield Corporation, Warren, Ohio, a corporation of Ohio
Filed May 11, 1964, Ser. No. 366,520
9 Claims. (Cl. 288—47)

This invention relates to equipment for joining metal strip in general end-to-end relation and more particularly to combined apparatus for positioning the end portions of strip lengths to be joined in the joining apparatus and for aligning the strip lengths both transversely and longitudinally so that the joint will be made in precise edge-to-edge relation and in such manner that the continuous joined strip will be free of camber or "dog leg." The primary object of the invention is the provision of practical apparatus for use directly in association with the strip joining equipment involved and which operates in a substantially automatic manner to rapidly accomplish these alignments immediately preparatory to the joining of the lengths.

While heretofore a number of proposals have been made to align the strip edge-to-edge at the joint line there have been only crude and somewhat impractical proposals for methods and means to longitudinally align a new or succeeding strip length with a first strip length about to be paid off through the joining equipment whereby the resulting continuous strip is free of camber or "dog leg." The aligning problem becomes somewhat acute when handling strip of thin gauge since edge rolls or other side guides cannot be used and since the centerline or longitudinal axis of the continuous strip between the joining equipment and the succeeding processing or utilization device in a line may shift sideways with respect to the centerline of the equipment and device. However, such strip centerline or longitudinal axis in and beyond the joining equipment is always substantially parallel with the centerline of the equipment so that the alignment problems may be solved by always bringing the centerline of the new strip into coincidence with the centerline of the prior to running strip, and this is accomplished in accordance with this invention in a simple, unique and practical manner.

It has heretofore been proposed to provide strip joining equipment with a head-end preloader whereby while one coil length of strip is being paid off and is running through the equipment to a subsequent unit in a production line the head end of a second coil of strip is prepositioned in the joining equipment. Upon the paying off of the first coil and temporary stoppage of the strip issuing from the equipment the splice may be made to the new coil with a minimum of delay. In this invention some of the preloading equipment and features as will be hereinafter explained are utilized to accomplish both transverse and longitudinal alignment of the new strip so that the overall apparatus remains quite simple and uncomplicated.

Specifically, the present invention utilizes the great strength of strip in the plane of the strip to force the head end of the new strip into longitudinal alignment with the prior or running strip. Thereafter, and after the running strip is stopped the great planar strength of the tail end portion of the stopped strip is utilized to accomplish edge-to-edge alignment of the two strip lengths. All of this may be accomplished automatically with suitable sequencing control integrated with the operation of the joining equipment as will be understood by those familiar with the art.

The above and other objects and advantages of the invention will become apparent upon consideration of the following specification and the accompanying drawing wherein there is disclosed a preferred embodiment of the invention.

In the drawing:

FIGURE 1 is a schematic representation, in side elevation, of strip joining equipment utilizing the alignment principles of the present invention; and FIGURE 2, consisting of parts A and B on two sheets, is a schematic representation, generally in plan, of the control instrumentality utilized with the apparatus of FIGURE 1.

To facilitate understanding of the invention the components of FIGURE 2 are in approximately the same relative positions that they are in FIGURE 1. Referring first to FIGURE 1, reference numeral 10 designates a suitable base on which is mounted a welding station 11 for joining strip in general end-to-end relation while the two lengths to be joined are securely held by the two pairs of clamps shown at this station. Reference numerals 12 and 13 represent payoff reels to hold coils of strip as they revolve and feed strip outwardly. It is well known in the art that such payoff reels may be of the cone, expanding mandrel or other construction to rigidly hold full coils of strip, and that it is common in the art to provide such reel assemblies with suitable means whereby the held coils may be shifted sideways along their axes. Such shifting means is schematically shown herein at 12S and 13S.

Strip is paid off from the reels 12 and 13 along paths 12P and 13P, respectively, and, as shown, path 12P is provided with a pair of pinch rolls 12R and a shear 12H while path 13P has pinch rolls 13R and a shear 13H. Path 12P is further provided with a pair of position sensing devices 14L and 14R—one for either side edge of the strip, and a similar pair of sensing devices 15L and 15R is provided for the path 13P. Further, path 12P is provided with a clamp 16 which is positioned on the base 10 intermediate the devices 14L, 14R and the welding station 11. A similar clamp 17, similarly positioned, is provided for the path 13P.

Slideably mounted on the base 10 beyond the welding station 11 is a slide 18 which is movable transversely of the general path of travel of the joined strip through the exit end of the combined apparatus as indicated by the arrow shown in FIGURE 1. Slide 18 carries a strip clamp 19 which is adjacent the welding station, and adjacent this clamp 19 is a further pair of position-sensing devices 20L and 20R—one for each side edge of the strip. For a purpose to be later described the sensing devices 20L and 20R are mounted on carriers which have sliding movement on the slide 18 transversely of the direction of strip travel. Likewise, the sensing devices 14L, 14R and 15L, 15R are supported by carriers which have sliding movement transversely of the direction of strip travel.

Also mounted on the slide 18 is an adjustable spring-biased deflector roll 21 which when in free or upper position supports the strip for free running through the apparatus when all the clamps are opened as shown in FIGURE 1. Pull-through tension is applied to the strip by a pair of driven bridle rolls shown at 22. Intermediate these rolls and the deflector roll 21 is a further pair of position-sensing devices 23L and 23R and, again, these devices are mounted on carriers which are movable transversely of the direction of strip travel. After strip from the coil on upper reel 12 is joined to the preceding exhausted strip length, the new strip may be rapidly drawn through the apparatus by the rolls 22 and in the process be supported by the rolls 12R, 21 and 22. The strip is thus kept away from any sliding contact with any of the clamp platens or with any of the carriers for the position-sensing devices. When strip is being paid off the coil held on lower reel 13 it is supported by a roll 24 journaled on the base 10 and by roll 21 as well as by the uppermost of the two rolls 22.

Referring now more particularly to FIGURE 2, the sensing devices 14, 15, 20 and 23, both L and R series, are each of the conventional photocell type wherein a maximum of light is transmitted when there is no interference whatever with the light beam but wherein the cell is activated to a predetermined extent when half the beam is interrupted as, for example, when the edge portion of the strip intersects the beam and the edge of the strip is at the center of the beam. The output signals of sensing devices 23L and 23R are amplified at 23LA and 23RA, respectively, and the outputs of these amplifiers are utilized to control suitable electric-hydraulic transducers 23LT and 23RT, respectively. These transducers are four-way valves used to control cylinders 23LC and 23RC, respectively. The operation is such that the sensing devices are caused to follow the side edges of the strip precisely and the resultant displacements of the pistons in the cylinders are sensed by the mechanical-electrical transducers which generate voltages proportional to the displacements of the pistons whereby an indication may be given of the instantaneous positions of the side edges of the strip. These last mentioned transducers are shown at 23LS and 23RS and their output voltages are impressed on conductors 25 and 26, respectively.

Instead of photocells, various air-responsive and mechanical devices may be used to sense the edge positions of the strip in carrying out the broader principles of my invention. However, the preferred method is illustrated.

The signal from conductor 25 is impressed on an amplifier 20LA the output of which controls an electro-hydraulic device 20LT which, again, comprises a four-way valve for regulating the position of the piston in double acting cylinder 20LC. This piston is connected to and moves the sensor unit 20L, and a feed-back circuit comprised of a position transmitter 20LS is provided for the amplifier 20LA in comparative relation with the signal impressed from conductor 25. The operation of these series 20L components is such as to cause the sensor 20L to follow precisely the lateral position of the sensor 23L. A similar set of components labeled 20RA, 20RC, 20RS and 20RT is provided in association with conductor 26 and sensor 20R to cause sensor 20R to follow precisely the lateral position of the sensor 23R.

The operating rod of cylinder 19C is connected to the clamp 19 through the slide 18 and is operative to move the clamp 19 laterally. Cylinder 19C is controlled by an electro-hydraulic servo mechanism 19CT the operation of which is directed by an amplifier 19A. Amplifier 19A is primarily controlled by a voltage signal transmitted through conductor 27 and derived from a suitable comparative interconnection between the sensors 20L and 20R. The operation of these various components is such that if, for example, the strip at sensors 20L and 20R is positioned to the right of the precise path through the sensors a voltage of one polarity will be impressed on conductor 27 to cause clamp 19 to be moved to the left and thereby draw the strip to the left, assuming that the clamp 19 is closed. If the strip is positioned to the left a negative signal is impressed on conductor 27 causing the clamp to jog to the right. In this manner the longitudinal center line of the strip which extends from the bridle rolls 22 back through the exit clamp of the welder 11 may be precisely controlled as to direction. This center line, however, need not coincide with the center line of the physical equipment. Limit switches 19LS keep the clamp within normal operating range and a manual control 19M is provided for manual control of the shifting of clamp 19 and for zeroing-in purposes.

As mentioned above, while strip is being paid off of one of the reels 12, 13 the lead end of strip from the other of the reels is preloaded into the head end of the welder preparatory to the rapid making of a new joint after which strip is paid off said other reel. Also, as stated above, the running strip (strip being paid off) is supported free and clear of clamps, etc. but in accordance with this invention the lead end of the new strip may be properly positioned longitudinally and properly aligned both in longitudinal direction and approximate lateral displacement during such running or paying off. This requires one set of sensors (14) and one clamp (16) for the upper pass and another set of sensors (15) and another clamp (17) for the lower pass, all as evident from FIGURE 1. A switching relay, not shown herein, is employed to shift control to the particular pass in which new strip is being preloaded, it being noted that no control is provided for the running strip pass particularly at the head end of the apparatus. This switching relay, in accordance with conventional practice, has many contacts some of which will be open to deactivate the upper pass control when the lower pass is being preloaded as indicated in FIGURE 1. In drawing section 2A, reference numeral 28 designates an open contact of the switching relay and reference numeral 29 designates a closed contact of this relay. Other similar drawing characters represent other open-close contacts throughout drawing section 2A. It should be noted, however, that the control for sensors 15L and 15R, clamp 17, and shifting actuator for clamp 17, all in the lower pass are shown in activated condition in the drawing. Since the corresponding control components are identical in structure and operation for both upper and lower passes only the latter will be described in detail herein.

Position sensors 15L and 15R are arranged for lateral shifting by the double acting cylinders 15LC and 15RC, respectively. These cylinders are controlled from signal amplifiers 15LA and 15RA through electro-hydraulic servo valve components 15LT and 15RT, respectively. The input control signal for amplifier 15LA is derived from a component furnished by conductor 25, a feedback component furnished by position transmitter 15LS operated by the rod of cylinder 15LC, and from a component generated by a manual control 15M. The latter control 15M is solely for the purpose of preposition the sensors 15L and 15R a greater or lesser distance apart to accommodate new strip which may be wider or narrower than the running strip to which the new strip will eventually be attached. With this exception the function of the control components is to preposition the sensors 15L and 15R in precise longitudinal alignment with the sensor series 20 and 23 on the exit end of the combined equipment. Even though adjustment is made for variation in new strip width the control equipment will operate to maintain a coincident center line as regards the running strip and the center line between the sensors 15L and 15R. To bring the center line of the new strip into coincidence with the above mentioned center line, I provide a cylinder 17C.

Cylinder 17C is controlled by an electro-hydraulic servo valve mechanism 17T which in turn is controlled by an amplifier 17A operated by an error signal furnished by conductor 30. The error signal of proper polarity and/or intensity, depending on the specific electrical system employed, is derived from the sensors 15L, 15R when the incoming new strip is to the right or left of the path predetermined by the positional settings of the sensors. The operation of these interconnected components is such as to automatically shift the new strip sideways to bring its center line into register with the center line of the running strip so that when the weld or other joint is made between the running strip and the new strip the joined edges will be either aligned or if the new strip is of different width the variation will be equally divided between opposite sides of the joint.

Considering now the overall operation of the apparatus it will be obvious that the long expanse of strip running through the apparatus will establish a center line direction which is generally parallel with if not coincident with the longitudinal center line of the equipment. By shifting the reel which is paying off the running strip by manual control, not shown, of one or the other of the cylinders 12S or 13S the lateral path of travel of the running strip may be regulated. If there is any weaving, however, the path is followed precisely by the sensors 20 and 23. Assuming that strip is running along the upper path from reel 12 a new coil of strip may be loaded onto reel 13 and rotated (by conventional means not shown) to first advance the leading edge of the new strip to shear 13H where the ragged leading end portion of strip may be cropped, and thereafter rotation of reel 13 may be resumed to advance the forward edge of the strip through the sensors 15 and clamp 17 to slightly beyond the center of the joining apparatus 11 which may conveniently be a traveling head overlap seam welder as is conventional in the art. Of course, upon loading of a new coil on the reel 13 the reel is shifted by the cylinder 13S to position the coil approximately upon the center line of the running strip. The threaded leading end portion of the new strip will accordingly be approximately aligned but to insure precise alignment the following sequence is effected.

An important feature of the present invention is that the head end portion of the new strip is precisely aligned in longitudinal direction with the running strip so that when the joint is made there will be no "dog leg" to cause further trouble. Since the leading end portion of the new strip from the coil to beyond the welder is initially loose and unconfined, waviness commonly occurs in it to render difficult the alignment procedure. To overcome this, I provide for the application of reduced controlled air pressure to the clamp cylinders which operate the clamps 16 and 17. The arrangement is shown schematically in FIGURE 1 where parallel air supplies are provided for the clamping cylinders, one supply for each cylinder including a regulating valve. This reduced pressure clamps the strip lightly but nevertheless permits the strip to be forcibly moved longitudinally and sideways in the clamps. Assuming as above that the lead end of the new strip in the bottom pass has been advanced slightly beyond the welding station 11 the lower clamp 17 is first lightly applied and thereafter the drive motor for the reel 13 is energized for jogging in reverse. This tightens the strip between clamp 17 and reel 13 and causes the strip to straighten out in the clamp as well as to perhaps shift sideways slightly in the clamp as the strip becomes flat between the clamp and the reel. To insure that this leading end portion of the strip is in approximately proper lateral position the shift cylinder 13S may be jogged. In any event, the effect of the manipulation is to insure that the strip which extends from the clamp 17 into the welder 11 is precisely aligned longitudinally and is in approximately proper lateral position. Upon this being accomplished, full line pressure is applied to the clamping cylinder for clamp 17, and thereafter the strip is precisely positioned laterally by action of the sensors 15L, 15R and the shift cylinder 17C as previously described.

After the clamp 17 is fully pressurized the reel 13 is jogged forwardly to provide enough slack in the strip for the cycle of operation of the welder 11 which in the case of an overlapped seam welder requires one of the lengths to be welded together to be advanced relative to the other through a precise distance to give a controlled overlap.

Upon the running strip becoming depleted is stopped and its ragged tail end is then cropped off by shear 12H, the line, including the bridle rolls 22 and other subsequent rolls, etc., is then restarted to position the sheared tail end of the running strip in proper position within the welder. Upon such positioning, the clamp 19 is actuated and the sensors 20 operate to control the cylinder 19C in such manner as to insure that the side edges of the previously free strip is accurately aligned longitudinally with the sensors 23. The entire tail end portion of the stop strip is thus brought into precise longitudinal direction, and during this adjustment the clamp 17 may, of course, be actuated to effect precise lateral alignment of the head end of the new strip which head end has previously been aligned longitudinally through the procedure outlined above.

After the strip lengths are finally aligned by the clamps 17 and 19 in the cycle above described, the entry and exit clamps of the welder 11 are closed so that the welder (or other joining device if used) may take over and complete the joint. During this joining phase the clamps 17 and 19 are opened, permitting the line to restart immediately upon completion of the joining after which running strip is paid off in the lower reel 13. The next succeeding coil length of strip is then, of course, supplied from the reel 12 and the selector relay is actuated to open contacts 29 while closing contacts 28 and to otherwise prepare for control along the upper path.

It should now be apparent that I have provided an improved method and apparatus for aligning strip both as to longitudinal direction and as to transverse position at a strip joining station which accomplishes the objects initially set out. Practically all the work of lateral and longitudinal directional alignment is done while strip is running and being supplied by the apparatus so that the "down time" required to effect a new joint is kept to an absolute minimum. This is highly desirable in high speed processing lines and in automated strip utilization lines, and the merit of the invention herein lies in the ability to make the joints or connections in very short periods of time while nevertheless improving the lateral and longitudinal alignment of the joined strip.

Having thus described my invention, what I claim is:

1. Apparatus for aligning both longitudinally and laterally the trailing end portion of a first strip length with the lead end portion of a second strip length preparatory to joining the same into one continuous strip length, comprising strip joining means, means beyond the exit end thereof for sensing the position of a side edge of the first mentioned portion at a plurality of longitudinally spaced points and thereby orienting the longitudinal center line of said first mentioned portion in a predetermined direction, means for skewing the lead end portion of said second strip length to bring the longitudinal center line thereof into accurate parallelism with said direction, and means for shifting said lead end portion of said second strip length laterally to bring the side edges thereof into accurate lateral alignment with the side edges of the trailing end portion of said first strip length.

2. Apparatus for preloading strip in a device operative to connect successive strip lengths in general end-to-end relation comprising strip joining means, a pair of vertically spaced clamps on the exit and entry ends of said means through which strip may freely run in a longitudinal direction when the clamps are opened, sensor means to sense the centerline position of the strip travelling through one of said clamps, means to close said clamps individually, and means responsive to the position of the strip travelling through the other of the clamps and responsive to a signal from said sensor means to shift said clamps laterally whereby a leading end portion of a successive strip length which is in one of said clamps may be aligned laterally with the strip length running through the other of said clamps.

3. Apparatus according to claim 2 further including control means for the clamps including means to apply reverse tension and movement to said lengths whereby the leading end portion of the said successive strip length may be drawn backwardly while held in its clamp to thereby effect a predetermined orientation of the center line of said leading end portion with the center line of the running strip.

4. Apparatus according to claim 2 wherein said sensor means comprises two vertically spaced sensors for tracking the side edges of a pair of vertically superimposed strip lengths located in the apparatus and for indicating the location of said edges, the upper sensor being operative independently of the lower sensor and vice versa.

5. In apparatus for connecting successive strip lengths in general end-to-end relation and wherein said successive strip lengths are fed into said apparatus along alternate upper and lower paths the combination of means to move a continuous connected length of strip longitudinally through said apparatus, means to sense and to indicate the center line of said continuous strip length, means to advance the leading end portion of a successive strip length into said apparatus, said apparatus having a strip connecting station, means to clamp said leading end portion of strip adjacent said station, and means to move said clamp laterally whereby a strip length held there may have one of its center lines brought into lateral registry with said first mentioned center line of continuous strip.

6. In apparatus for connecting successive strip lengths in general end-to-end relation comprising a strip connecting station, a strip clamp adjacent said station on the exit side thereof, a strip tension device at the exit end of said apparatus and operative to restrain rearward movement of strip through the apparatus, a spring-biased deflector roll between said clamp and strip tension device operative to maintain strip lying between said clamp and said tension device in a taut condition upon actuation of the clamp, means to align a side edge of the taut strip in a predetermined absolute direction, and said connecting device being operative to join the leading end of a successive strip length to the tail end of said first mentioned strip.

7. Apparatus according to claim 6 further characterized in that said means to align said taut strip comprises means to move said clamp laterally, and mechanical means interconnecting said clamp and deflector roll whereby said clamp and roll move in unison.

8. The method of effecting both longitudinal and lateral alignment of successive strip lengths preparatory to joining them in general end-to-end relation which consists of establishing a predetermined center line for the trailing end of the leading length, lightly clamping the leading end portion of the trailing length adjacent its free end, forcibly retracting said leading end portion in a direction parallel with said center line, and shifting said leading end portion laterally to bring its center line into coincidence with the first mentioned center line.

9. In apparatus for connecting successive lengths of strip in general end-to-end relation and having a strip connecting station, the combination of means to support the trailing end portion of a first length of strip with its trailing edge properly positioned in said connecting station, means to automatically align the longitudinal center line of said trailing end portion in a predetermined direction, roller means outside of said connecting station to feed the leading end portion of a successive strip length to a position wherein the leading edge thereof is positioned in said connecting station, and means to shift said roller means sideways sufficiently to effect approximate coincidence between the longitudinal center lines of said first and succeeding strip lengths.

References Cited

UNITED STATES PATENTS

| | | | |
|---|---|---|---|
| 2,550,512 | 4/1951 | Woolrich | 29—493 |
| 2,987,816 | 12/1956 | Noland | 29—493 |
| 2,827,809 | 3/1958 | Beam | 228—4 |
| 2,978,805 | 4/1961 | Greenberger. | |
| 3,021,416 | 2/1962 | Mallett et al. | 219—82 |
| 3,057,056 | 10/1962 | Foley et al. | |
| 3,198,413 | 8/1965 | Cooper | 228—4 |

FOREIGN PATENTS 770,926  3/1957  Great Britain.

RICHARD H. EANES, Jr., *Primary Examiner.*

M. L. FAIGUS, *Assistant Examiner.*